Aug. 20, 1957  A. Y. DODGE  2,803,324
ONE-WAY CLUTCH
Filed May 3, 1954

INVENTOR:
Adiel Y. Dodge,
BY
Bair, Freeman & Molinare
ATTORNEYS.

United States Patent Office 2,803,324
Patented Aug. 20, 1957

2,803,324

ONE-WAY CLUTCH

Adiel Y. Dodge, Rockford, Ill.

Application May 3, 1954, Serial No. 427,079

7 Claims. (Cl. 192—45.1)

This invention relates to one way clutches and more particularly to a one way clutch of the tilting gripper type.

In tilting gripper type clutches, it is highly desirable, if not essential, that the grippers be held together in properly assembled relationship and be resiliently urged to tilt in the engaging direction. Heretofore, this has been accomplished by mounting the grippers in an annular cage and by employing springs to urge the grippers toward their engaging positions. Such constructions, however, are relatively expensive to manufacture and assemble and require separate cages for each different size of assembly.

It is also desirable in one way clutches to provide a large contact area between the gripper assembly and the races to avoid damage or excessive wear of the parts due to slipping or overrunning. It is additionally highly advantageous to provide a clutch unit which can function as a bearing during overrunning.

It is one of the objects of the present invention to provide a one way clutch in which the grippers are held assembled and are urged to tilt to their engaged positions in an extremely simple and inexpensive manner.

Another object is to provide a one way clutch in which the grippers are secured together by bodies of resilient rubber-like material arranged between the grippers and secured to the faces thereof.

According to one feature of the invention, the bodies of material are formed of resilient tubes secured by cement or the like to the gripper faces. With this type of construction, a clutch of substantially any desired size can be made by merely increasing the number of grippers and connecting bodies without requiring special parts for different clutch sizes.

A further object is to provide a clutch in which the grippers are mounted between expansible sleeves which are expanded into engagement with the races as the grippers tilt in one direction and which contract away from the races when the grippers tilt in the opposite direction.

According to one feature of the invention, the resilient bodies which connect the grippers are also secured to the sleeves to hold all of the parts resiliently assembled.

A still further object is to provide a clutch in which contraction of the sleeves is positively limited so that the sleeves may function as bearing surfaces between the races during overrunning.

According to a feature of the invention, the grippers may be provided with extensions engaging the sleeves to limit tilting of the grippers in the disengaging direction thereby to limit contraction of the sleeves.

The above and other objects and features of the invention will be more readily apparent from the following description when read in connection with the accompanying drawing, in which.

Figure 1:
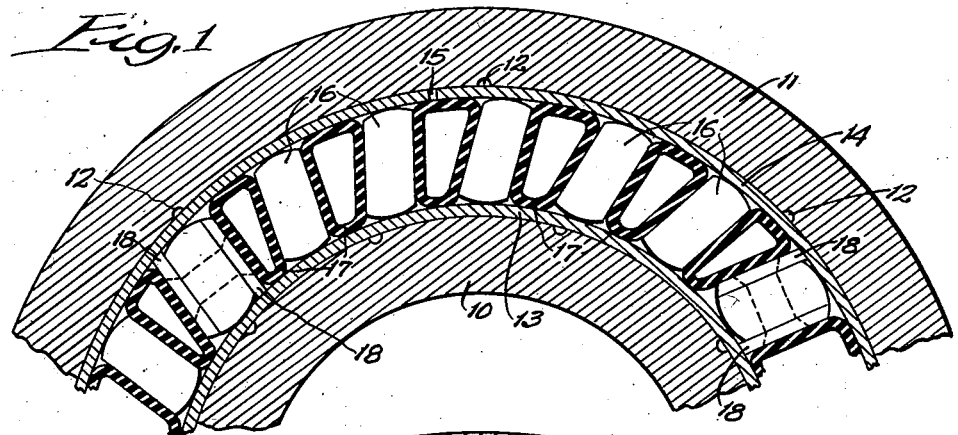
Figure 1 is a transverse section through a clutch embodying the invention with parts in elevation.

The clutch, as shown in Figure 1, is adapted to connect inner and outer concentric races 10 and 11 for rotation together in one direction, but for free relative rotation in the opposite direction. The races, as shown, are formed with coaxial cylindrical surfaces which may be provided with oil grooves, as indicated at 12, to hold lubricant on the surfaces during overrunning and to enable the lubricant to be squeezed out of the surfaces during clutch engagement.

Figure 3:
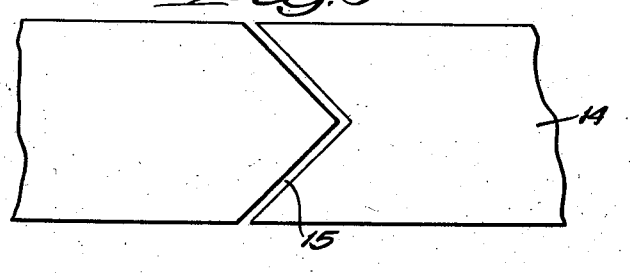
Figure 3 is a partial plan view of one of the clutch sleeves.

The clutch itself comprises a pair of expansible sleeves 13 and 14 fitting against the inner and outer races, respectively. To engage the clutch, the sleeves are expanded into gripping engagement with the races, as explained hereinafter, and to release the clutch the sleeves contract away from the races to permit overrunning thereof. Each sleeve may be cut with a V-slot thereacross, as shown at 15 in Figure 3, so that the sleeves may expand and contract, as desired, and to avoid any square parting lines extending axially of the races which might dig into the races or interfere with the clutch operation.

The sleeves are adapted to be moved into engagement with the races by a series of tiltable grippers 16 mounted between the sleeves and having their ends curved about spaced centers. When the grippers are tilted counter-clockwise, as seen in Figure 1, they will expand the sleeves away from each other into gripping engagement with the races. When the grippers are tilted clockwise, pressure against the sleeves will be relieved so that the sleeves can contract to disengage the races.

According to the present invention, the grippers are connected in an assembly and are urged toward tilting position by resilient rubber-like bodies mounted between the grippers and secured to the faces thereof. As shown, the rubber-like bodies are in the form of tubes 17 of rubber, synthetic rubber, or similar material mounted between adjacent grippers and secured to the flat faces of the grippers by cement or similar bonding processes.

Figure 4:
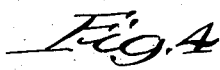
Figure 4 is an end elevation of one of the resilient connecting tubes.
Figure 5:
Figure 5 is a side view of a connecting tube.

The tubes preferably tend to assume a cross-sectional form, as shown in Figure 4, and may be rolled slightly before being cemented to the grippers so that they tend to tilt the grippers counter-clockwise toward their engaging positions. The inner and outer surfaces of the tubes may also be cemented or otherwise bonded to the sleeves 13 and 14 to hold the grippers and sleeves in a unitary assembly. It will be understood that the full contacting areas of the tubes are not cemented to either the grippers or the sleeves so that the grippers and tubes can move as the grippers tilt.

In the normal condition, the sleeves 13 and 14 have a light frictional engagement with the races due either to the natural bias of the sleeves or to the action of the grippers thereon in response to the resilient biasing effect of the tubes. When the outer race 11 tends to turn counter-clockwise relative to the inner race the outer sleeve will tend to turn counter-clockwise relative to the inner sleeve and will tilt the grippers counter-clockwise. The grippers will thereupon spread the sleeves into tight wedging contact with the race surfaces so that the races will be connected to turn together. When the outer race turns clockwise, the grippers will in the same manner be tilted clockwise to allow the sleeves to move out of engagement with the race surfaces so that the races can turn freely relative to each other.

In order that the clutch assembly may function as a bearing between the races during overrunning, means are provided to limit movement of the sleeves toward each other whereby they may function as bearing surfaces between the races. As shown in Figure 1, this means is provided by extensions 18 rigidly secured to the faces of certain of the grippers to engage the sleeves when the grippers tilt clockwise toward their clutch releasing position. When the projections 18 engage the sleeves, further tilting of the grippers will be prevented and they will function as rigid blocks between the sleeves to hold the sleeves spaced apart a pre-determined distance. Under these conditions, the sleeves are in effect rigidly connected and function as a bearing between the inner and outer races.

Figure 2:
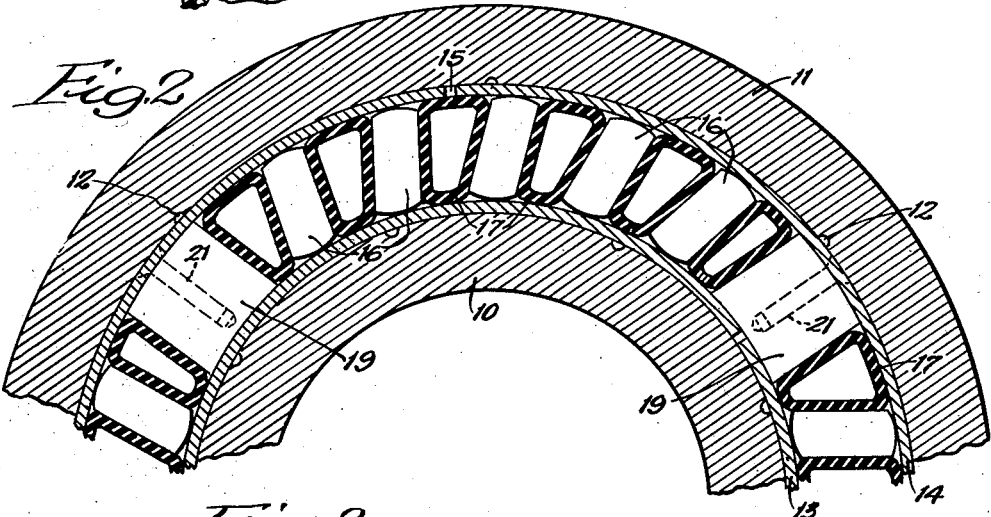
Figure 2 is a partial view similar to Figure 1 showing an alternative construction.

In the alternative construction shown in Figure 2 the sleeves are positively held spaced apart during overrunning by fixed blocks 19 mounted at spaced points in the series of grippers and secured to one of the sleeves by rivets or screws 21. In this construction, the clutch may engage in the same manner as in Figure 1, but during overrunning the blocks 19 will positively hold the sleeves 13 and 14 properly spaced to function as bearings between the races.

While two embodiments of the invention have been shown and described herein, it will be understood that they are illustrative only and not to be taken as a definition of the scope of the invention, reference being had for this purpose to the appended claims.

What is claimed is:

1. A one way clutch for use between concentric cylindrical races comprising inner and outer concentric expansible sleeves, a series of tiltable grippers between the sleeves formed with their ends curved about spaced centers to expand the outer sleeve and contract the inner sleeve when the grippers are tilted in one direction and to allow the inner sleeve to expand and the outer sleeve to contract when the grippers are tilted in the other direction, and resilient means engaging the grippers and urging them to tilt in said one direction.

2. A one way clutch for use between concentric cylindrical races comprising inner and outer concentric expansible sleeves, a series of tiltable grippers between the sleeves formed with their ends curved about spaced centers to expand the outer sleeve and contract the inner sleeve when the grippers are tilted in one direction and to allow the inner sleeve to expand and the outer sleeve to contract when the grippers are tilted in the other direction, resilient means engaging the grippers and urging them to tilt in said one direction, and projections on at least a part of the grippers engageable with the sleeves to limit tilting of the grippers in said other direction thereby to limit contraction of the outer sleeve and expansion of the inner sleeve.

3. A one way clutch for use between concentric cylindrical races comprising inner and outer concentric expansible sleeves, a series of tiltable grippers between the sleeves formed with their ends curved about spaced centers to expand the outer sleeve and contract the inner sleeve when the grippers are tilted in one direction and to allow the inner sleeve to expand and the outer sleeve to contract when the grippers are tilted in the other direction, resilient means engaging the grippers and urging them to tilt in said one direction, and rigid spacer blocks between the sleeves at spaced points to limit contraction of the outer sleeve and expansion of the inner sleeve.

4. A one way clutch for use between concentric cylindrical races comprising inner and outer concentric expansible sleeves, a series of tiltable grippers between the sleeves formed with their ends curved about spaced centers to expand the outer sleeve and contract the inner sleeve when the grippers are tilted in one direction and to allow the inner sleeve to expand and the outer sleeve to contract when the grippers are tilted in the other direction and bodies of resilient material lying between and secured to the opposite faces of the grippers to hold the grippers together and to yield as the grippers tilt.

5. A one way clutch for use between concentric cylindrical races comprising inner and outer concentric expansible sleeves, a series of tiltable grippers between the sleeves formed with their ends curved about spaced centers to expand the outer sleeve and contract the inner sleeve when the grippers are tilted in one direction and to allow the inner sleeve to expand and the outer sleeve to contract when the grippers are tilted in the other direction and bodies of resilient material lying between adjacent grippers and secured to the faces of the grippers and to the sleeves to hold the grippers assembled with the sleeves.

6. A one way clutch for use between concentric cylindrical races comprising inner and outer concentric expansible sleeves, a series of tiltable grippers between the sleeves formed with their ends curved about spaced centers to expand the outer sleeve and contract the inner sleeve when the grippers are tilted in one direction and to allow the inner sleeve to expand and the outer sleeve to contract when the grippers are tilted in the other direction and tubes of resilient rubber-like material between adjacent grippers secured to the faces of the grippers.

7. A one way clutch for use between concentric cylindrical races comprising inner and outer concentric expansible sleeves, a series of tiltable grippers between the sleeves formed with their ends curved about spaced centers to expand the outer sleeve and contract the inner sleeve when the grippers are tilted in one direction and to allow the inner sleeve to expand and the outer sleeve to contract when the grippers are tilted in the other direction, and means secured to the sleeves between adjacent grippers to prevent relative circumferential movement of the grippers relative to the sleeves.

References Cited in the file of this patent

UNITED STATES PATENTS

| | | |
|---|---|---|
| 1,359,468 | Schmidt | Nov. 16, 1920 |
| 2,555,484 | Gruenberg | June 5, 1951 |